Sept. 8, 1953　　　　　J. F. NAYLOR　　　　　2,651,271
HEATING SYSTEM FOR BAKERS' OVENS AND OTHER HEATING CHAMBERS
Filed April 28, 1950　　　　　　　　　　　　　3 Sheets-Sheet 1
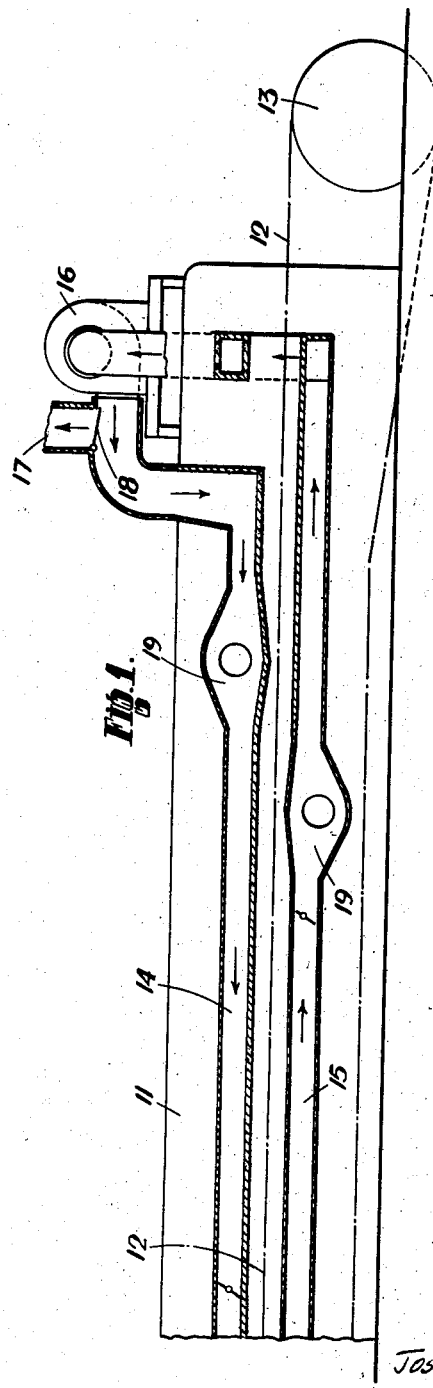
Inventor
JOSEPH FRANCIS NAYLOR
By
Attorney

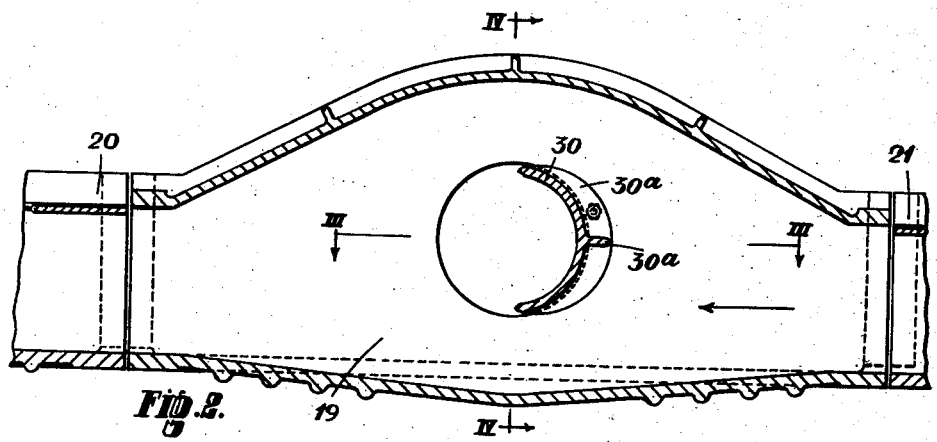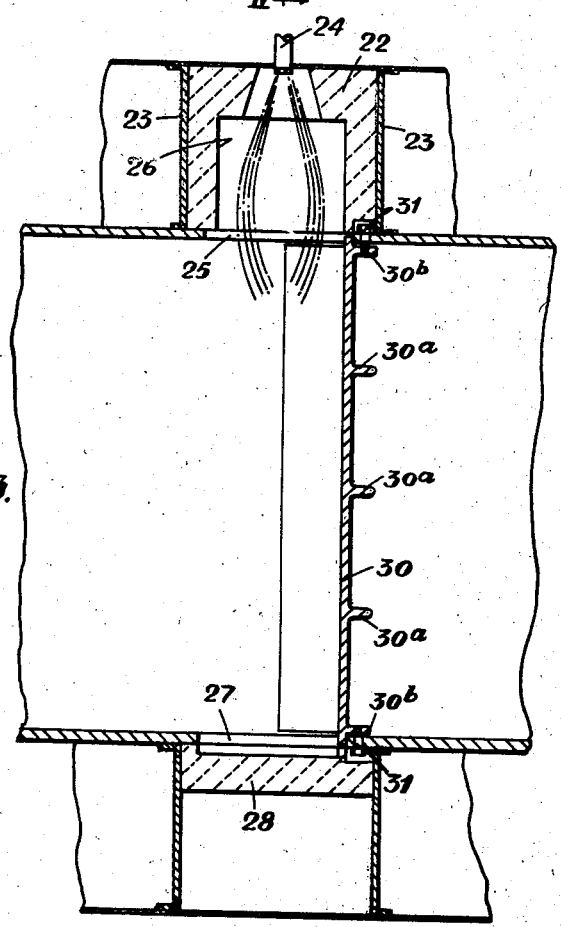

Sept. 8, 1953 J. F. NAYLOR 2,651,271
HEATING SYSTEM FOR BAKERS' OVENS AND OTHER HEATING CHAMBERS
Filed April 28, 1950 3 Sheets-Sheet 3
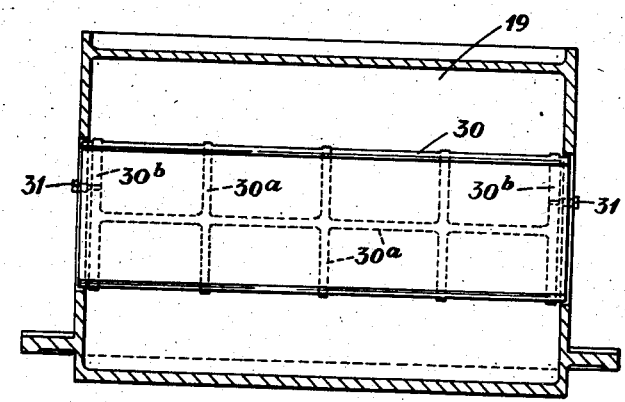
Fig.4.
Fig.5.
Fig.6.
Fig.7.
Inventor
JOSEPH FRANCIS NAYLOR
Attorney Patented Sept. 8, 1953

2,651,271

UNITED STATES PATENT OFFICE 2,651,271

HEATING SYSTEM FOR BAKERS' OVENS AND OTHER HEATING CHAMBERS

Joseph Francis Naylor, Newton-Le-Willows, England, assignor to T. & T. Vicars Limited, Newton-Le-Willows, England, a British company Application April 28, 1950, Serial No. 158,725
In Great Britain April 28, 1949

2 Claims. (Cl. 107—63)

This invention concerns heating systems for bakers' ovens and other heating chambers of the type in which a conveyor adapted to carry the material to be heat treated passes between heat exchange ducts which are part of a closed system adapted for the circulation of a gaseous heat carrying medium and having heating means at intervals therein.

The principal object of the invention is to provide a heating system of the above type in which the heating means are more efficiently operated and have a considerably longer life than known types.

According to the present invention a heating system for a heating chamber includes in combination a heat exchange duct, means to impel a gaseous heat carrying medium along said duct in one direction, means to inject the hot products of combustion into said duct, and a deflector shield of heat resisting material disposed in said duct and immediately and substantially wholly prior to said injector means in the direction of flow of the gaseous heat carrying medium, to wholly deflect the gaseous heat carrying medium from direct passage to said injector means.

The invention will be described further by way of example with reference to the accompanying drawings, in which:

Fig. 1 is a schematic representation in section of one end of a heating system of the type described, the deflector shields being omitted, Fig. 2 is a more detailed sectional elevation at one of the enlarged portions of the ducting, Fig. 3 is a sectional plan view on the line III—III of Fig. 2, Fig. 4 is a sectional end elevation on the line IV—IV of Fig. 2, and Figs. 5, 6 and 7 are sectional elevations of alternatively shaped shields.

Referring to the diagrammatic Fig. 1, a heating system of the type described is provided in a long oven 11 in which the biscuits are to be baked. An endless conveyor 12 passes over a roll 13 outside one end of the oven 11 and between two lengths 14, 15 of heat exchange ducts. It then passes over a similar roll (not shown) outside the other end of the oven and back to the first roll 13 along the bottom of the oven. The upper and lower lengths 14, 15 of the heat exchange ducts are connected by trunks at one end of the oven (not shown) and at the other end of the oven the lower length of ducting 15 exhausts to a circulating fan 16 which feeds the upper length of ducting 14. An escape chimney 17 controlled by damper 18 is provided just after the fan outlet.

The direction of circulation of a heat carrying gaseous medium is indicated by the arrows. At intervals along the ducts 14, 15 enlarged portions 19 are provided at which heating means are disposed.

Referring now to the more detailed Figs. 2, 3 and 4, an enlarged portion of the ducting is generally designated by the numeral 19. The portions of the ducting may be conveniently cast and connected together by means of an encircling strip of heat resisting material such as asbestos which is bolted to one of a pair of connected lengths of ducting by bolts passing through a steel plate laid on the asbestos (not shown). A gap left between each two successive portions allows for expansion. The enlarged portion 19 connects two portions 20, 21 of ducting of normal dimensions and the direction of the heat carrying medium is indicated by the arrow (Fig. 2). At the central region of the enlarged portion 19 spacing means are provided to locate the ducting substantially centrally of the oven. These means comprise at one side of the oven a burner block 22 held in position by metal support pieces 23.

An external burner mechanism has a nozzle 24 which is accommodated in the burner block 22 and is adapted to eject hot gases through an aperture 25 provided in the sides of the ducting which corresponds with a passage 26 through the burner block 25. A similar aperture 27 is provided in the opposite side of the ducting and is sealed off by a block 28 supported by spacing means between the ducting side and the other oven wall. The burner may, for instance, be of the oil, gas, or pulverised fuel type, in which case the heat-carrying medium will consist of hot air and other gases.

Between the heating means, which is constituted by the inflow of the hot gases from the burner and the oncoming heat carrying medium from other burners of similar construction, is disposed a suitable shield 30 of heat resisting material. The shield 30 is semi-circular in cross section and extends transversely of the duct. The shield 30 is provided with strengthening ribs 30a on its convex face, which face is towards the oncoming heat carrying medium, and at each end of the shield 30 a rib 30b is adapted for locating the shield 30 in position within the duct, having an internally threaded hole to receive a fixing bolt 31 through the duct wall.

The shield may, of course, be of any suitable cross sectional form such as straight sided (Fig. 5), wishbone shape (Fig. 6) or crescent shaped (Fig. 7).

In known form of ovens where no shields are provided in the region of the burners it is very often found that at the enlarged portions of the ducting, particularly in the region of the inlet for the hot gases from the burner, incandescent conditions obtain. This leads not only to quick deterioration of the ducting in this region but to inefficient and unequal heating effects over the ducting lengths. In addition, the burner flame is interfered with by the flow of heat carrying medium. When shields are adopted according to the present invention, the oncoming heat carrying medium which can advantageously be circulated at low velocity by the fan, is deflected above and below the flow of hot gases from the burners and this action has substantial advantages.

In operation the burner flame is protected by the shield of heat resisting material. The circulating gases are diverted above and below the flame and due to their contact with the shield, which tends to be maintained at a high temperature by reason of its close proximity to the burner, have their temperature raised. The shield which presents a fairly large area to the flow is, of course, cooled. In addition the circulating gases which are divided by the shield and are caused to pass above and below the flame induce additional hot gaseous products of combustion from the burner portion of the duct to join them, thereby helping further to raise the temperature of the combined gaseous mass in the burner region. As the gases pass into the portion of the ducts prior to the next burner most of this heat is given up in heating the metal of the ducts and they are, therefore, at a reduced temperature when they reach the next burner where they are re-heated. In this way the heat produced by the burners instead of causing an incandescent condition and a considerable localised rise in temperature in the ducting, confined to the enlarged portions, is dispersed more quickly and uniformly than in known ovens of this type.

In addition, by providing means for adjusting the amount of fuel supplied to each individual burner the oven may be divided into zones, the heating effect of which may be varied independently of each other, within limits.

The efficient dispersal of the heat from the immediate region of the burners not only promotes a more evenly distributed heating effect over the whole system but also by reducing the operating temperature of the burners and their immediate surroundings allows them to be kept in use for a considerably longer period than would otherwise be the case.

I claim:

1. A heating system for a heating chamber including in combination a heat exchange duct, means to impel a gaseous heat carrying medium along said duct in one direction, means to inject hot products of combustion into said duct at right angles thereto, and a trough-like deflector shield of heat resisting material disposed in said duct along the path of the injected combustion products to shield same from the heat carrying medium impelled along said duct, wholly closed on the upstream side and wholly open on the downstream side to allow undisturbed flow of the products of combustion thereby shielded into the downstream current passing the said shield.

2. A heating system for a heating chamber including in combination a heat exchange duct, means to impel a gaseous heat carrying medium along said duct in one direction, means to inject hot products of combustion into said duct at right angles thereto, a trough-like deflector shield of heat resisting material disposed in said duct along the path of the injected combustion products to shield same from the heat carrying medium impelled along said duct, wholly closed on the upstream side and wholly open on the downstream side to allow undisturbed flow of the products of combustion thereby shielded into the downstream current passing the said shield, and strengthening ribs on the upstream side of said shield.

JOSEPH FRANCIS NAYLOR.

References Cited in the file of this patent

UNITED STATES PATENTS

| Number | Name | Date |
| --- | --- | --- |
| 1,657,959 | Crosland | Jan. 31, 1928 |
| 1,727,598 | Hofmann | Sept. 10, 1929 |
| 1,863,391 | Bluemel | June 14, 1932 |
| 2,297,314 | Offen | Sept. 29, 1942 |
| 2,332,866 | Muller | Oct. 26, 1943 |
| 2,535,650 | Neutelings et al. | Dec. 26, 1950 |